(12) United States Patent
Wieteska et al.

(10) Patent No.: US 10,836,679 B2
(45) Date of Patent: Nov. 17, 2020

(54) BUILDING PRODUCTS COMPRISING GRAPHENE OR GRAPHENE OXIDE IN THE BULK MATERIAL AND METHOD FOR PRODUCING SUCH BUILDING PRODUCTS

(71) Applicant: Knauf Gips KG, Iphofen (DE)

(72) Inventors: Marcin Wieteska, Warsaw (PL); Grzegorz Kiedrzyn, Wroclaw (PL)

(73) Assignee: Knauf Gips KG, Iphofen (DE)

( * ) Notice: Subject to any disclaimer, the term of this patent is extended or adjusted under 35 U.S.C. 154(b) by 98 days.

(21) Appl. No.: 15/780,165

(22) PCT Filed: Dec. 18, 2015

(86) PCT No.: PCT/EP2015/002556
§ 371 (c)(1),
(2) Date: May 30, 2018

(87) PCT Pub. No.: WO2017/092778
PCT Pub. Date: Jun. 8, 2017

(65) Prior Publication Data
US 2018/0354856 A1  Dec. 13, 2018

(30) Foreign Application Priority Data

Nov. 30, 2015 (DE) .................. 10 2015 015 301

(51) Int. Cl.
| | | |
|---|---|---|
| C04B 28/14 | (2006.01) | |
| E04C 2/04 | (2006.01) | |
| C04B 28/02 | (2006.01) | |
| E04C 1/00 | (2006.01) | |
| B32B 9/00 | (2006.01) | |
| B32B 13/02 | (2006.01) | |
| B32B 13/04 | (2006.01) | |
| C04B 14/02 | (2006.01) | |
| E04C 1/40 | (2006.01) | |
| E04C 2/26 | (2006.01) | |
| C04B 111/00 | (2006.01) | |

(52) U.S. Cl.
CPC .............. *C04B 28/14* (2013.01); *B32B 9/007* (2013.01); *B32B 13/02* (2013.01); *B32B 13/04* (2013.01); *C04B 14/022* (2013.01); *C04B 28/02* (2013.01); *E04C 1/00* (2013.01); *E04C 1/40* (2013.01); *E04C 2/043* (2013.01); *E04C 2/044* (2013.01); *E04C 2/26* (2013.01); *B32B 2419/00* (2013.01); *B32B 2607/00* (2013.01); *C04B 2111/00612* (2013.01)

(58) Field of Classification Search
USPC .................... 428/408, 703; 106/680; 156/39
See application file for complete search history.

(56) References Cited

U.S. PATENT DOCUMENTS

| | | | |
|---|---|---|---|
| 2014/0329045 A1 | 11/2014 | Jones | |
| 2015/0152314 A1* | 6/2015 | Muthusamy | E21B 33/13 |
| | | | 106/696 |

FOREIGN PATENT DOCUMENTS

| | | |
|---|---|---|
| CN | 103359997 A | 10/2013 |
| CN | 103922687 A | 7/2014 |
| EP | 2533976 A1 | 12/2012 |
| WO | 2011/093765 A1 | 8/2011 |
| WO | 2013/076372 A1 | 5/2013 |

OTHER PUBLICATIONS

Written Opinion of the International Search Authority, PCT/2015/002556, dated Mar. 15, 2016, downloaded from the WIPO web site.

* cited by examiner

*Primary Examiner* — Archene A Turner
(74) *Attorney, Agent, or Firm* — Mark Terry

(57) ABSTRACT

The invention relates to building products that contain graphene and/or graphene oxide in the bulk component thereof. The addition of graphene and/or graphene oxide improves the mechanical properties of said building products, particularly in terms of strength.

12 Claims, No Drawings

BUILDING PRODUCTS COMPRISING GRAPHENE OR GRAPHENE OXIDE IN THE BULK MATERIAL AND METHOD FOR PRODUCING SUCH BUILDING PRODUCTS

The invention relates to building products containing graphene or graphene oxide and a method for producing such building products. In particular, the invention relates to building panels comprising gypsum which contain graphene or graphene oxide in the bulk material thereof.

The invention relates to building products, particularly building panels. More particularly, the invention relates to building products and building panels that comprise a material with a hexagonal honeycomb structure, preferably in monomolecular layer thickness.

Building products such as building panels, partition wall bricks, screeds, plasters or putties are known from the prior art. All these products must possess a certain resistance to mechanical and/or thermal load. There are various possible ways to impart these properties to a given product. Most simply, the basic materials for manufacturing the product are chosen on the basis of the desired property. However, if combinations of several properties are desired in one product, it is often not enough to simply choose the appropriate base material. In these cases, functional materials in the broadest sense of the word are needed.

Materials from two-dimensional matrices with monomolecular layer thickness such as graphene or silicene are relatively new materials on the market of material sciences. They have outstanding mechanical, chemical and electrical properties, which will be exploited within the scope the present invention.

Graphene is a material that forms the basic structure of graphite. Graphite consists of layers of graphene stacked one on top of the other in tidy or disorganized layers, which are held together in layer packages by the relatively weak Van-der-Waals forces. The mechanical properties of graphite are dominated by the layer package bond brought about by the Van-der-Waals forces. The layers that are held together by the Van-der-Waals forces can be divided into smaller layer packages quite easily by shearing. This is what enables them to be used as pencil lead for writing, for example.

In contrast to this, in pure graphene there are no Van-der-Waals bonds, precisely because its layers are only a single molecule thick, the layer packages that make up graphite do not occur in graphene. In ideal graphene, a hexagonal base structure exists, in which six C atoms are each bonded to each other by non-localised covalent bonds to form honeycomb structures. The bonding energy between two of these C atoms is among the strongest forces known in nature, with a strength in the order of about 5.9 eV. This explains why this material is so much more stable than graphite: it has been demonstrated that graphene has greater tensile strength than steel.

The mechanical properties of graphene oxide are almost as good as those of graphene. The base structure is similar to that of graphene, that is to say it consists of monomolecular layers of hexagonal-honeycomb structures, which however have a more pronounced corrugation. Graphene oxide is water-soluble and forms a colloidal dispersion with water, which lends itself very well to the manufacture of paper-like foils and use as coating substance.

The terms "graphene" and "graphene oxide" are also used to refer to modifications/derivatives or functionalised compounds that are derived directly from these materials.

For the purposes of this invention, the terms graphene and graphene oxide denote not only the pure substances, but also mixtures, particularly mixtures of graphene and/or graphene oxide with graphite. Mixtures containing graphene or graphene oxide are considered to be those that contain more than 1% by vol. graphene or graphene oxide, particularly preferably more than 3% by volume most preferably more than 10% by vol. graphene or graphene oxide, confirmed with atomic force microscopy in combination with Raman spectroscopy.

For the purposes of this application, the term graphene is used to refer not only to the form having monomolecular layer thickness, but also when it occurs in layer stacks of less than 10 graphene layers, as it is also used in the literature (see also Eigler, S. and Hirsch, A, (2014): Chemie an Graphen und Graphenoxid—eine Herausforderung für Synthesechemiker, Angew. Chem. 2014, Vol. 126, S. 2-23). Graphene layer stacks that contain 11 or more layers of graphene are considered to be graphite.

The invention thus relates to building products that comprise graphene and/or graphene oxide. The invention further includes building panels that contain graphene and/or graphene oxide.

The object of the invention is to prepare building products having improved mechanical properties, particularly those of bending and/or compressive strength. The invention also relates to a method for manufacturing such building products.

The object is solved with building products having the features of claim 1 and a method for manufacturing the building products having the features of claim 9. Advantageous variations of the building product and the method are standardised in the subordinate claims.

Accordingly, such building products contain graphene and/or graphene oxide. Said building products may be building panels, particularly drywall panels. Most preferably, these drywall panels include a cement-based binder, preferably gypsum. However, the building products according to this invention may also be partition wall bricks, screeds, plasters or putties.

Particularly preferred are building materials containing a calcium sulphate base, that is to say building materials with a base consisting of anhydrite, calcium sulphate hemihydrate and gypsum. Materials with a base that contains calcium sulphate have a calcium sulphate fraction of at least 10% by weight, preferably at least 50% by weight, and particularly preferably at least 80% by weight relative to the dry binder fraction of the mixture.

Alternatively, the invention is also applicable to building products that contain cement, wherein the calcium sulphate content in these products may be less than the 10% by weight of the dry mass of the binder cited above, or the product may even be substantially free from calcium sulphate. In this case, the binder may be for example a hydraulic cement, another inorganic binder such as water glass, or an organic binder such as a natural or synthetic resin.

Moreover, regardless of their base material, building panels fall within the scope of the invention if they contain a material with a hexagonal honeycomb structure and a monomolecular layer thickness. Building panels for drywall may be made with a base consisting of an enormously wide range of materials, for example wood, gypsum, cement, microspheres (e.g., perlite, cenospheres from fly ash, ceramic microbeads) and so on. Particularly the tensile strength of graphene and graphene oxide can be used to advantage to improve the mechanical properties of building panels in terms of sagging resistance, breaking load and flexural strength.

In addition, particularly graphene with its two-dimensional hexagonal honeycomb structure and monomolecular layer thickness has significant potential for improving the flame resistance of building materials, particularly building panels or plasters. The thermal conductivity of graphene is strongly anisotropic: It is very high in the direction of propagation of the two-dimensional lattice, but very low in directions perpendicular to the direction of propagation of the two-dimensional lattice. This means that high temperatures on one side of a graphene layer are not transferred to its other side.

According to a particularly preferred embodiment of the invention, the building products contain the graphene and/or graphene oxide in the form of shavings or flakes. In this form, the graphene or graphene oxide can be distributed evenly and homogeneously in a bulk material, and it is therefore particularly preferred. A further advantage consists in that even small quantities can be distributed homogeneously. Since both graphene oxide, and particularly graphene, are very expensive substances, this is a significant advantage.

In a refinement of this embodiment, it is provided that the graphene and/or graphene oxide is only contained in parts of the building product, not in all of it. If the building product is a building panel, for example, particularly a drywall panel such as a gypsum plasterboard panel, the building panel may consist of a plurality of layers having the same or different compositions. Thus, it is conceivable for example that the building panel comprise a porous core and dense outer layers. In this case, only the core layer or only the one or more outer layers may contain graphene and/or graphene oxide. This also reduces costs.

Particularly preferably, only the outer layers of such a building panel contain graphene and/or graphene oxide, since these outer layers are decisive for the purpose of defining the external strength of the building panel.

A method according to the invention for manufacturing a building product with graphene and/or graphene oxide comprises mixing graphene and/or graphene oxide, particularly in the form of shavings or flakes, particularly preferably in the form of a suspension with a cement-based binder and water, and optionally other additives, shaping the mixture and drying the building product that is shaped in this way.

The graphene and/or graphene oxide is used particularly preferably in the form of a suspension. Such suspensions can be produced relatively easily from graphite powder by shearing in a solvent, preferably water with a tenside. The content of graphene and/or graphene oxide that is created by the shearing and thus also the splitting of the graphite layer packages, depends on the shear rate. The higher the shear rate, the larger the fraction of graphene and/or graphene oxide shavings or flakes produced. Therefore, a shear rate greater than $10^4$ s$^{-1}$ is particularly preferred for preparing the suspension.

Finally, this invention is also intended to extend to the use of graphene and/or graphene oxide to improve the mechanical strength of building products or increase the fire protection class of building products. The building products may particularly be building products that contain cement, preferably gypsum. Such building products may be for example building panels, partition wall bricks, screeds, plasters and putties.

The invention claimed is:

1. Building products, wherein the building products contain graphene and/or graphene oxide produced by shearing graphite powder and adding a tenside.

2. Building product according to claim 1, wherein the building product is a building panel, a partition wall brick, a screed, a plaster or a putty.

3. Building product according to claim 2, wherein the building product contains graphene and/or graphene oxide shavings or flakes.

4. Building product according to claim 3, wherein the graphene and/or the graphene oxide is distributed homogeneously in the building product.

5. Building product according to claim 4, wherein only a part of the building product contains graphene and/or graphene oxide.

6. Building product according to claim 5, wherein the building product is a building panel.

7. Building panel according to claim 6, wherein the building panel consists of at least one core layer and at least one outer layer, wherein at least either the core layer or the outer layer contains graphene and/or graphene oxide shavings or flakes.

8. Building product according to claim 7, wherein the building product comprises a binder that contains cement.

9. Method for producing a building product containing graphene and/or graphene oxide, comprising mixing graphene and/or graphene oxide, particularly in the form of shavings or flakes, with a cement-based binder and water, shaping the mixture and drying the building product that is shaped in this way, wherein the graphene and/or graphene oxide is used in the form of a suspension, particularly a suspension in water, and wherein the suspension is produced by shearing graphite powder and adding a tenside.

10. Method according to claim 9, wherein a shear rate greater than $10^4$ s$^{-1}$ is used to produce the suspension.

11. Use of graphene and/or graphene oxide in building products to improve their mechanical strength or increase the fire protection class of the building products, wherein the building products are building products that contain cement wherein the graphene and/or graphene oxide is used in the form of a suspension and wherein the suspension is produced by shearing graphite powder and adding a tenside.

12. Use according to claim 11, wherein the building products include building panels, partition wall bricks, screeds, plasters and putties.

\* \* \* \* \*